United States Patent [19]
Muller et al.

[11] Patent Number: 6,021,132
[45] Date of Patent: Feb. 1, 2000

[54] SHARED MEMORY MANAGEMENT IN A SWITCHED NETWORK ELEMENT

[75] Inventors: Shimon Muller, Sunnyvale; Ariel Hendel, Cupertino; Ravi Tangirala, Mountain View; Curt Berg, Los Altos, all of Calif.

[73] Assignee: Sun Microsystems, Inc., Mountain View, Calif.

[21] Appl. No.: 08/987,914

[22] Filed: Dec. 9, 1997

Related U.S. Application Data

[63] Continuation-in-part of application No. 08/885,118, Jun. 30, 1997.

[51] Int. Cl.[7] .................................................... H04L 12/46
[52] U.S. Cl. ............................................ 370/412; 370/418
[58] Field of Search .................................... 370/351, 389, 370/390, 395, 401, 411, 412, 413, 418; 395/200.68, 200.75, 200.33; 711/147, 148, 149, 153

[56] References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/88 |
| 4,641,302 | 2/1987 | Miller | 370/60 |
| 4,737,953 | 4/1988 | Koch et al. | 370/94 |
| 4,935,869 | 6/1990 | Yamamoto | 364/200 |
| 5,130,977 | 7/1992 | May et al. | 370/60 |
| 5,159,685 | 10/1992 | Kung | 395/575 |
| 5,163,046 | 11/1992 | Hahne et al. | 370/79 |
| 5,309,437 | 5/1994 | Perlman et al. | 340/827 |
| 5,313,454 | 5/1994 | Bustini et al. | 370/13 |
| 5,353,412 | 10/1994 | Douglas et al. | 395/325 |
| 5,365,514 | 11/1994 | Hershey et al. | 370/17 |
| 5,396,602 | 3/1995 | Amini et al. | 395/325 |
| 5,402,415 | 3/1995 | Turner | 370/60 |
| 5,404,538 | 4/1995 | Krappweis, Sr. | 395/725 |
| 5,420,862 | 5/1995 | Perlman | 370/85.13 |

(List continued on next page.)

OTHER PUBLICATIONS

"Foundry Products", downloaded from Website http://www.foundrynet.com/ on Jun. 19, 1997.

Anthony J. McAuley & Paul Francis, "Fast Routing Table Lookup Using CAMs", IEEE, 1993, pp. 1382–1390.

(List continued on next page.)

*Primary Examiner*—Ricky Ngo
*Assistant Examiner*—Frank Duong
*Attorney, Agent, or Firm*—Blakely Sokoloff Taylor & Zafman

[57] ABSTRACT

A method and apparatus for shared memory management in a switched network element is provided. According to one aspect of the present invention, a shared memory manager for a packet forwarding device includes a pointer memory having stored therein information regarding buffer usage (e.g., usage counts) for each of a number of buffers in a shared memory. An encoder is coupled to the pointer memory for generating an output which indicates a set of buffers that contains a free buffer. The shared memory manager further includes a pointer generator that is coupled to the encoder for locating a free buffer in the set of buffers. The pointer generator is further configured to produce a pointer to the free buffer based upon the output of the encoder and the free buffer's location within the set of buffers. According to another aspect of the present invention, a packet forwarding device includes a number of output ports for transmitting packets onto a network and a number of input ports coupled to the output ports for receiving packets from the network, buffering the packets, and forwarding the packets to one or more of the output ports. The packet forwarding device also includes a shared memory that is segmented into buffers for temporarily buffering the packets. No more than one copy of a given packet is ever stored in the shared memory. The packet forwarding device further includes a shared memory manager which dynamically allocates buffers on behalf of the input ports and tracks ownership counts for each of the buffers.

13 Claims, 7 Drawing Sheets

U.S. PATENT DOCUMENTS

| | | | |
|---|---|---|---|
| 5,425,026 | 6/1995 | Mori | 370/60 |
| 5,432,907 | 7/1995 | Picazo, Jr. et al. | 395/200 |
| 5,490,260 | 2/1996 | Miller et al. | 395/427 |
| 5,493,564 | 2/1996 | Mullan | 370/54 |
| 5,500,860 | 3/1996 | Perlman et al. | 370/85.13 |
| 5,509,123 | 4/1996 | Dobbins et al. | 395/200.15 |
| 5,517,488 | 5/1996 | Miyazaki et al. | 370/16 |
| 5,550,816 | 8/1996 | Hardwick et al. | 370/60 |
| 5,553,067 | 9/1996 | Walker et al. | 370/60 |
| 5,557,610 | 9/1996 | Calamvokis et al. | 370/60.1 |
| 5,561,791 | 10/1996 | Mendelson et al. | 395/550 |
| 5,563,878 | 10/1996 | Blakeley et al. | 370/60 |
| 5,566,170 | 10/1996 | Bakke et al. | 370/60 |
| 5,592,476 | 1/1997 | Calamvokis et al. | 370/390 |
| 5,608,726 | 3/1997 | Virgile | 370/401 |
| 5,615,340 | 3/1997 | Dai et al. | 395/200.17 |
| 5,623,489 | 4/1997 | Cotton et al. | 370/381 |
| 5,633,810 | 5/1997 | Mandal et al. | 364/514 |
| 5,689,506 | 11/1997 | Chiussi et al. | 370/388 |
| 5,689,518 | 11/1997 | Galand et al. | 371/37.1 |
| 5,734,651 | 3/1998 | Blakeley et al. | 370/392 |
| 5,748,631 | 5/1998 | Bergantino et al. | 370/398 |
| 5,751,971 | 5/1998 | Dobbins et al. | 395/200.68 |
| 5,754,774 | 5/1998 | Bittinger et al. | 395/200.33 |
| 5,802,047 | 9/1998 | Kinoshita | 370/359 |
| 5,812,527 | 9/1998 | Kline et al. | 370/232 |
| 5,815,737 | 7/1998 | Buckland | 395/905 |
| 5,822,319 | 10/1998 | Nagami et al. | 370/392 |
| 5,835,491 | 11/1998 | Davis et al. | 370/386 |
| 5,856,977 | 1/1999 | Yang et al. | 370/411 |
| 5,859,849 | 1/1999 | Parks | 370/395 |
| 5,872,783 | 2/1999 | Chin | 370/395 |
| 5,875,464 | 2/1999 | Kirk | 711/129 |
| 5,931,980 | 11/1998 | Varma et al. | 370/395 |

OTHER PUBLICATIONS

"Gigabit Ethernet", Network Strategy Report, The Burton Group, v2, May 8, 1997 40 pages.

"IP On Speed", Erica Roberts, Internet–Draft, Data Communications on the Web, Mar. 1997, 12 pages.

"Multilayer Topology", White Paper, Internet–Draft, 13 pages, downloaded from Website http://www.baynetworks.com on Apr. 18, 1997,.

Internaitonal Search Report, PCT/US98/13361, 5 pages.

International Search Report, PCT/US98/13200, 6 pages.

International Search Report, PCT/US98/13206, 8 pages.

International Search Report, PCT/US98/13362, 5 pages.

International Search Report, PCT/US98/13203, 7 pages.

International Standard ISO/IEC 10038, ANSI/IEEE Std 802.1D, First Edition, 1993.

"Load Balancing for Multiple Interfaces for Transmission Control Protocol/Internet Protocol for VM/MVS", IBM Technical Disclosure Bulletin, 38(9):7–9 (Sep., 1995).

T. Nishizono et al., "Analysis on a Multilink Packet Transmission System", Electron. Commun. JPN 1, Commun., (USA), 68(9):98–104 (Sep., 1985).

International Search Report, PCT/US 98/13200.

Internationl Search Report, PCT/US 98/13361.

International Search Report, PCT/US 98/13380.

SHARED MEMORY MANAGEMENT IN A SWITCHED NETWORK ELEMENT

CROSS-REFERENCES TO RELATED APPLICATIONS

The present application is a continuation-in-part of co-pending U.S. patent application Ser. No. 08/885,118, entitled, "Shared Memory Management in a Switched Network Element" filed on Jun. 30, 1997, attorney docket number 082225.P2354.

FIELD OF THE INVENTION

The invention relates generally to the field of packet forwarding in computer networking devices. More particularly, the invention relates to shared memory management in a switched network element.

BACKGROUND OF THE INVENTION

An increasing number of users are requiring increased bandwidth from existing networks due to multimedia applications for accessing the Internet and World Wide Web, for example. Therefore, future networks must be able to support a very high bandwidth and a large number of users. Furthermore, such networks should be able to support multiple traffic types such as data, voice, and video which typically require different bandwidths.

Statistical studies indicate that the network domain, i.e., a group of interconnected local area networks (LANs), as well as the number of individual end-stations connected to each LAN, will grow at ever increasing rates in the future. Thus, more network bandwidth and more efficient use of resources is needed to meet these increasing rates.

A common source of inefficiency in prior switched network elements is the memory management mechanism for packet buffering. Packet buffering is typically required in a switched network element to avoid packet loss. One potential cause of congestion is a speed mismatch between an input port and an output port. For example, if a fast input port (e.g., 1,000Mb/s) forwards traffic to a slow output port (e.g., 10Mb/s), the slower output port will not be able to transmit packets onto the network as fast as it is receiving packets from the faster input port. Thus, packets must be buffered or they will be dropped. Particular traffic patterns may also result in congestion. The traffic patterns crossing the switched network element may be such that several input ports need to forward data to the same output port, for example. As a result, temporary congestion on that output port may occur. Further, multicast traffic arriving at one or more input ports may need to be forwarded to many output ports. This causes traffic multiplication which may also result in temporary congestion on one or more output ports. Finally, competition for common resources may contribute to congestion. For example, common resources required for packet forwarding may cause incoming traffic to accumulate on one or more input ports. Packets may need to be buffered at a particular input port while another input port is accessing a particular common resource such as a forwarding database.

Typically, one of two approaches is employed to achieve the required packet buffering. The first approach, input port buffering, associates packet (buffer) memory to input ports for temporarily storing packet data until it can be forwarded to the appropriate output port(s). The second approach, output port buffering, associates packet memory to the output port for temporary storage of packet data until it can be transmitted onto the attached link.

A major architectural challenge in implementing a high performance switched network element is the provision of just the right amount of packet buffering for each port. An inadequate amount of packet memory, even on only one of the ports, may have serious performance implications for the entire switch. On the other hand, too much buffering will unnecessarily increase the cost of the switching fabric with no incremental benefit. Due to the difficulty of estimating buffering requirements for each port, many implementations either cost too much or do not perform very well, or both.

Based on the foregoing, it should be apparent that one candidate for improved efficiency is the memory management mechanism of a networking device. Further, recognizing the intrinsic efficiency of sharing resources and the bursty nature of network traffic, it is desirable to utilize a dynamic packet memory management scheme to facilitate sharing of a common packet memory among all input/output ports for packet buffering.

SUMMARY OF THE INVENTION

A method and apparatus for shared memory management in a switched network element is described. According to one aspect of the present invention, a shared memory manager for a packet forwarding device includes a pointer memory having stored therein information regarding buffer usage for each of a number of buffers in a shared memory. An encoder is coupled to the pointer memory. The encoder is configured to generate an output which indicates a set of buffers that contains one or more free buffers. The shared memory manager further includes a pointer generator. The pointer generator is coupled to the encoder and is configured to locate a free buffer in the set of buffers. The pointer generator is further configured to produce a pointer to the free buffer based upon the output of the encoder and the free buffer's location within the set of buffers.

According to another aspect of the present invention, a packet forwarding device includes a number of output ports for transmitting packets onto a network and a number of input ports coupled to the output ports for receiving packets from the network, buffering the packets, and forwarding the packets to one or more of the output ports. The packet forwarding device also includes a shared memory coupled to the output ports and the input ports. The shared memory is segmented into a number of buffers for temporarily buffering the packets. However, at any given time, no more than one copy of a given packet is stored in the shared memory. The packet forwarding device further includes a shared memory manager coupled to the input ports and to the output ports. The shared memory manager dynamically allocates buffers on behalf of the input ports and tracks ownership counts for each of the buffers based upon information provided by the input ports and the output ports.

According to yet another aspect of the present invention, a method is provided for packet forwarding. The method includes dynamically allocating one or more buffer pointers that identify one or more buffers in a shared memory. When a packet is received the packet is stored in the one or more buffers. Then, the buffer pointers are transferred based upon a forwarding decision. Finally, the packet is transmitted after retrieving the packet from the buffers.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for shared memory management in a switched network element is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. While the steps of the present invention are preferably performed by the hardware components described below, the steps may alternatively be embodied in machine-executable instructions stored in a machine-readable medium, such as a memory, CD-ROM, diskette or other storage medium, which may be used to cause a general-purpose or special-purpose processor programmed with the instructions to perform the steps. Further, embodiments of the present invention will be described with reference to a high speed Ethernet switch. However, the method and apparatus described herein are equally applicable to other types of network devices and protocols.

An Exemplary Network Element

Figure 1:
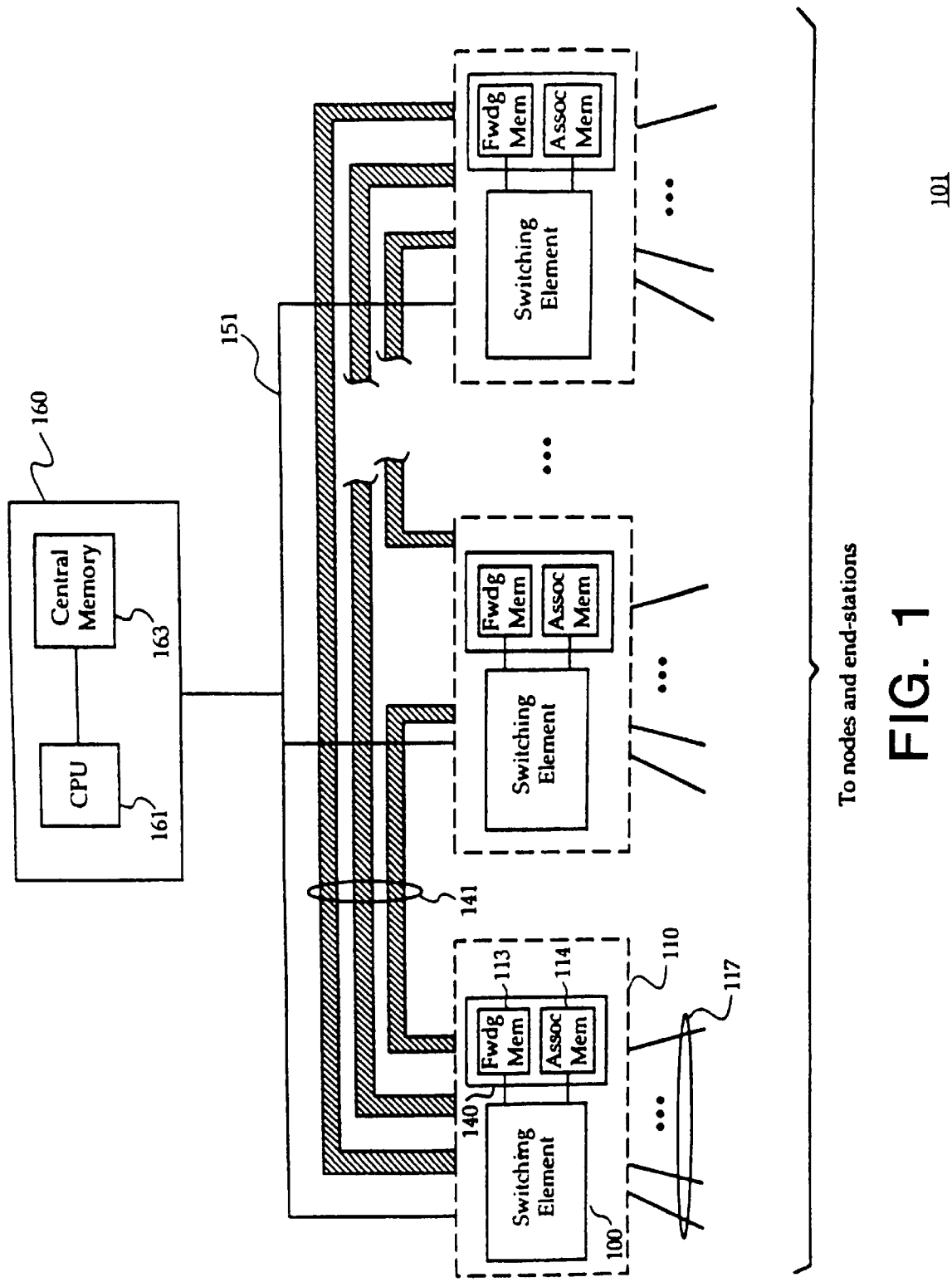
FIG. 1 illustrates a switch according to one embodiment of the present invention.

An overview of one embodiment of a network element that operates in accordance with the teachings of the present invention is illustrated in FIG. 1. The network element is used to interconnect a number of nodes and end-stations in a variety of different ways. In particular, an application of a multi-layer distributed network element (MLDNE) would be to forward packets according to predefined protocols over a homogenous data link layer such as the IEEE 802.3 standard, also known as Ethernet. Other protocols can also be used.

The MLDNE's distributed architecture can be configured to forward message traffic in accordance with a number of known or future forwarding algorithms. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer. TCP is also referred to here as a Layer 4 protocol, while the IP is referred to repeatedly as a Layer 3 protocol. For purposes of discussion, references to Layers herein typically refer to the Open Systems Interconnection (OSI) seven layer model created by the International Organization for Standardization (ISO).

In one embodiment of the MLDNE, a network element is configured to implement packet forwarding functions in a distributed manner, i.e., different parts of a function are performed by different subsystems in the MLDNE, while the final result of the functions remains transparent to the nodes and end-stations. As will be appreciated from the discussion below and the diagram in FIG. 1, the MLDNE has a scalable architecture which allows the designer to predictably increase the number of external connections by adding additional subsystems, thereby allowing greater flexibility in defining the MLDNE as a stand alone router.

As illustrated in block diagram form in FIG. 1, the MLDNE 101 contains a number of subsystems 110 that are interconnected using a number of internal links 141 to create a larger switch. According to one embodiment, the subsystems 110 may be fully meshed by providing at least one internal link between any two subsystems. Each subsystem 110 includes a switching element 100 coupled to a forwarding and filtering memory 140, also referred to as a forwarding database. The forwarding and filtering database may include a forwarding memory 113 and an associated memory 114. The forwarding memory (or database) 113 stores an address table used for matching with the headers of received packets. The associated memory (or database) stores data associated with each entry in the forwarding memory that is used to identify forwarding attributes for forwarding the packets through the MLDNE. A number of external ports (not shown) having input and output capability interface the external connections 117. In one embodiment, each subsystem supports multiple Gigabit Ethernet ports (The term Gigabit Ethernet, as used herein shall apply to networks employing Carrier Sense, Multiple Access with Collision Detection (CSMA/CD) as the medium access method, generally operating at a signaling rate of 1,000 Mb/s over various media types and transmitting Ethernet formatted or Institute of Electrical and Electronic Engineers (IEEE) standard 802.3 formatted data packets), Fast Ethernet ports (The term Fast Ethernet, as used herein shall apply to networks employing CSMA/CD as the medium access method, generally operating at a signaling rate of 100 Mb/s over various media types and transmitting Ethernet formatted or IEEE standard 802.3 formatted data packets) and Ethernet ports (The term Ethernet, as used herein shall apply to networks employing CSMA/CD as the medium access method, generally operating at a signaling rate of 10 Mb/s over various media types and transmitting Ethernet formatted or IEEE standard 802.3 formatted data packets). Internal links 141 are used to couple internal ports (not shown). Using the internal links, the MLDNE can connect multiple switching elements together to form a multigigabit switch.

The MLDNE 101 further includes a central processing system (CPS) 160 that is coupled to the individual subsystem 110 through a communication bus 151, such as the peripheral components interconnect (PCI). PCI is mentioned merely as an exemplary communication bus, those of ordinary skill in the art will appreciated the type of bus may vary for different implementations. The CPS 160 includes a central processing unit (CPU) 161 coupled to a central memory 163. Central memory 163 includes a copy of the data contained in the individual forwarding memories 113 of the various subsystems 110. The CPS 160 has a direct control and communication interface to each subsystem 110 and provides some centralized communication and control between switching elements 100.

An Exemplary Switching Element

Figure 2:
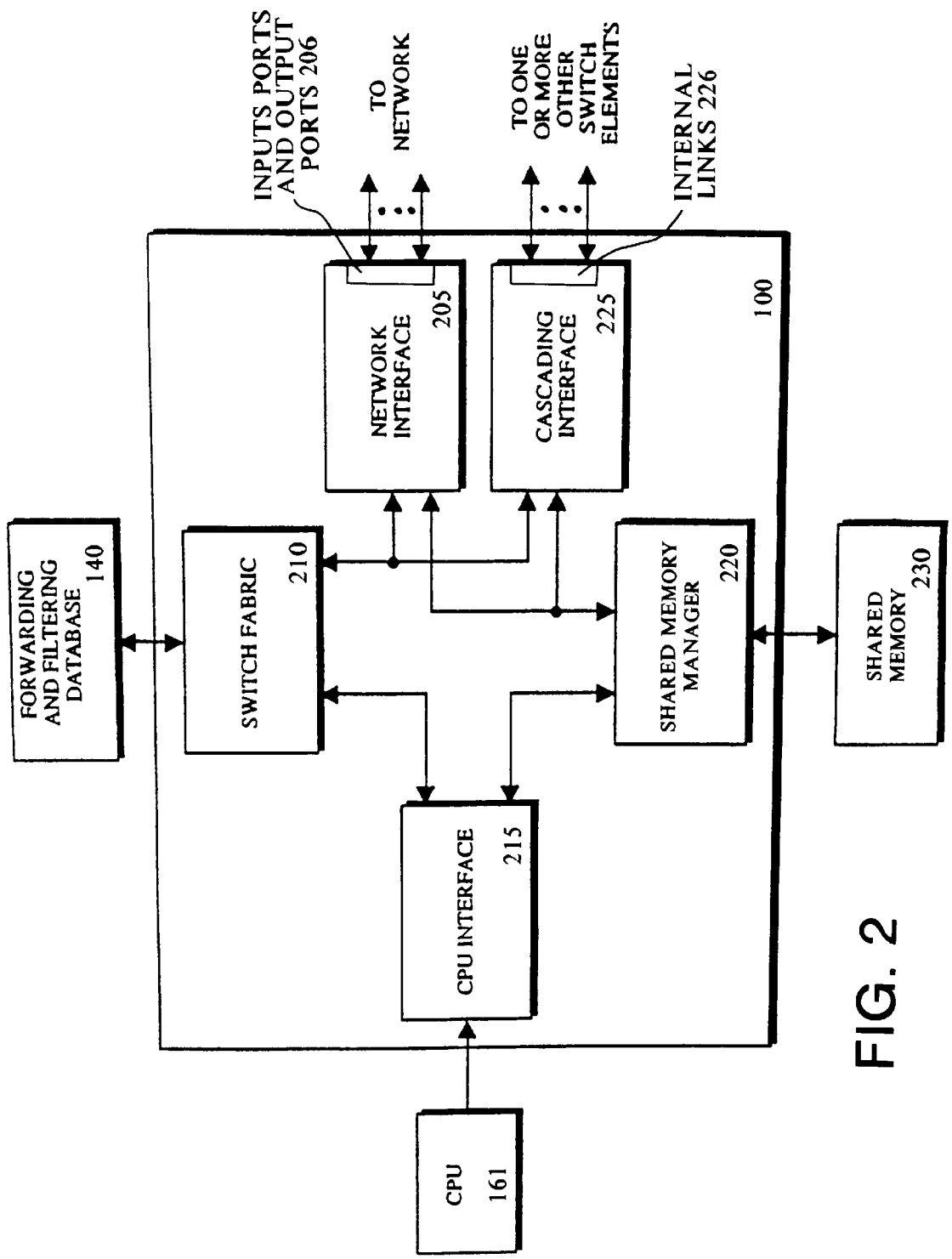
FIG. 2 is a simplified block diagram of an exemplary switching element that may be utilized in the switch of FIG. 1.

FIG. 2 is a simplified block diagram illustrating an exemplary architecture of the switching element of FIG. 1. The switching element 100 depicted includes a central processing unit (CPU) interface 215, a switch fabric block 210, a network interface 205, a cascading interface 225, and a shared memory manager 220.

Packets may enter or leave the network switching element 100 through any one of the three interfaces 205, 215, or 225. In brief, the network interface 205 operates in accordance with a network communication protocol, such as Ethernet, to receive packets from a network (not shown) and to transmit packets onto the network via one or more input ports and output ports 206, respectively. An optional cascading interface 225 may include one or more internal links 226 for interconnecting switching elements 100 to create larger switches. For example, each switching element 100 may be connected together with other switching elements 100 in a full mesh topology to form a multi-layer switch as described above. Alternatively, a switch may comprise a single switching element 100 with or without the cascading interface 225.

The CPU 161 may give commands or packets to the network switching element 100 via the CPU interface 215. In this manner, one or more software processes running on the CPU 161 may manage the entries in the external forwarding and filtering database 140, such as adding new entries and invalidating unwanted entries. In alternative embodiments, however, the CPU 161 may be provided with direct access to the forwarding and filtering database 140. In any event, for purposes of packet forwarding, the CPU port of the CPU interface 215 resembles a generic port into the switching element 100 and may be treated as if it were simply another external network interface port. However, since access to the CPU port occurs over a bus such as a peripheral components interconnect (PCI) bus, the CPU port does not need any media access control (MAC) functionality.

Returning to the network interface 205, the two main tasks of input packet processing and output packet processing will now briefly be described. Input packet processing may be performed by one or more input ports of the network interface 205. Input packet processing includes the following: (1) receiving and verifying incoming Ethernet packets, (2) modifying packet headers when appropriate, (3) requesting buffer pointers from the shared memory manager 220 for storage of incoming packets, (4) requesting forwarding decisions from the switch fabric block 210, (5) transferring the incoming packet data to the shared memory manager 220 for temporary storage in an external shared memory 230, and (5) upon receipt of a forwarding decision, forwarding the buffer pointer(s) to the output port(s) 206 indicated by the forwarding decision. Output packet processing may be performed by one or more output ports 206 of the network interface 205. Output processing may include requesting packet data from the shared memory manager 220, transmitting packets onto the network, and requesting deallocation of buffer(s) after packets have been transmitted.

The network interface 205, the CPU interface 215, and the cascading interface 225 are coupled to the shared memory manager 220 and the switch fabric block 210. The shared memory manager 220 provides an efficient centralized interface to the external shared memory 230 for buffering of incoming packets. The switch fabric block 210 includes a search engine and learning logic for searching and maintaining the forwarding and filtering database 140 with the assistance of the CPU 161.

The switch fabric block 210 includes a search engine that provides access to the forwarding and filtering database 140 on behalf of the interfaces 205, 215, and 225. Packet header matching, learning, packet forwarding, filtering, and aging are exemplary functions that may be performed by the switch fabric block 210. Each input port 206 is coupled with the switch fabric block 210 to receive forwarding decisions for received packets. The forwarding decision indicates the outbound port(s) (e.g., external network port or internal cascading port) upon which the corresponding packet should be transmitted. Additional information may also be included in the forwarding decision to support hardware routing such as a new MAC destination address (DA) for MAC DA replacement. Further, a priority indication may also be included in the forwarding decision to facilitate prioritization of packet traffic through the switching element 100.

In the present embodiment, Ethernet packets are centrally buffered by the shared memory manager 220. The shared memory manager 220 interfaces every input port and output port 206 and performs dynamic memory allocation and deallocation on their behalf, respectively. During input packet processing, one or more buffers are allocated in the external shared memory 230 and an incoming packet is stored by the shared memory manager 220 responsive to commands received from the network interface 205, for example. Subsequently, during output packet processing, the shared memory manager 220 retrieves the packet from the external shared memory 230 and deallocates buffers that are no longer in use. Because multiple ports can own a given buffer, to assure no buffers are released until all output ports 206 have completed transmission of the data stored therein, the shared memory manager 220 preferably also tracks buffer ownership.

Packet Switching Overview

According to one embodiment of the present invention, the switching element 100 of the present invention provides wire speed routing and forwarding of Ethernet, Fast Ethernet, and Gigabit Ethernet packets among the three interfaces 215, 205, and 225. By "wire speed" what is meant is the forwarding decision for a packet received on a given input port 206 is complete before the next packet arrives at that input port 206.

Forwarding is performed by passing pointers from input ports to output ports 206. The shared memory manager 220 provides a level of indirection which is exploited by the input and output ports 206 by locally storing pointers to buffers that contain packet data rather than locally storing the packet data itself. For example, input and output queues may be maintained at input and output ports 206 respectively for temporarily storing pointers during input and output packet processing. The memory for buffering incoming packets is allocated from a common pool of memory (e.g., the shared memory 230) that is shared by all the input ports and output ports 206 of the switching element 100.

Briefly, the packet forwarding process begins with a packet being received at one of the switching element's input ports 206. It is important to note that, by keeping a predetermined number of buffer pointers on hand to allow immediate storage of received packet data, input ports 206 are always prepared to receive the next packet. These buffer pointers may be preallocated during the switching element's 100 initialization and subsequently requested from the shared memory manager 220 when the number of pointers falls below a predetermined threshold. Returning to the present example, the a portion of the received packet may be buffered temporarily at the input port 206 while a determination is made regarding the output port(s) 206 to which the packet is to be forwarded. Packets that are to be filtered, therefore, need not be stored in the shared memory 230.

After a forwarding decision is received for a particular packet, the input port 206 transfers ownership of the one or more buffers corresponding to the packet to the appropriate output port(s) 206. The transfer of ownership includes the input port 206 notifying the shared memory manager 220 of the number of output ports 206 that should transmit the packet and the input port 206 forwarding the appropriate pointers to those output ports 206.

Upon receipt of a buffer pointer, an output port 206 stores the pointer in an output queue until it can be transmitted onto the attached link. When the output port 206 is finished transmitting packet data from a particular buffer it notifies the shared memory manager 220 that it is finished with the buffer. The shared memory manager 220 then updates its internal counts used for tracking the number of buffer owners and returns the buffer to the free pool if appropriate (e.g., the buffer is no longer in any output queues).

From the above overview, it should be appreciated that the use of buffer pointers reduces forwarding to the transfer of one or more buffer pointers from an input port 206 to one or more output ports 206. Further, flooding and the processing of multicast packets are made more efficient because packet data need not be duplicated. In fact, regardless of the number of output ports on which a particular packet is to be forwarded, only a single copy of the packet data will ever exist in the shared memory 230. Thus, as one advantage of the present embodiment, the architecture gracefully scales by accommodating an increased number of ports without requiring a proportionate increase in buffer memory.

Shared Memory Organization

Prior switching elements may have a fixed amount of memory associated with each port, resulting in inefficient memory allocation and buffering that is not related to the actual amount of traffic through a given port. Further, since the buffer memory is distributed, the logic for buffer management is duplicated for each port. In contrast, the shared memory manager 220 provides an efficient centralized interface to a shared pool of packet memory for buffering of incoming packets. Moreover, the memory management mechanism provided by the present invention is designed to achieve efficient allocation of per port buffering that is proportional to the amount of traffic through a given port. According to one embodiment, this proportional buffering is achieved by employing shared memory 230 in combination with a dynamic buffer allocation scheme. The shared memory 230 is a pool of buffers that is used for temporary storage of packet data en route from an inbound interface (e.g., an input port 206 in the network interface 205, the cascading interface 225, or the CPU interface 215) to one or more outbound interfaces (e.g., an output port 206 in the network interface 205, the cascading interface 225, or the CPU interface 215). Essentially, the shared memory 230 serves as an elasticity buffer for adapting between the incoming and outgoing bandwidth requirements.

At this point, it may be useful to discuss the tradeoffs among certain shared memory parameters including buffer size, address space, and output/input pointer queue sizes. For example, a larger buffer size will more likely accommodate a full packet rather than a portion of a packet. However, potentially more buffer memory will be consumed when the packet size is not an integer multiple of the buffer size. Smaller buffer sizes, on the other hand, conserve memory in this situation due to the finer resolution. However, more addresses may be required to uniquely identify the buffers and each packet potentially requires more buffers for storage. Additionally, more pointers may need to be queued at both the input and output ports 206 as a result of increasing the number of buffers per packet. Further, if the environment is not known in advance, it is desirable to provide programmable resources, thereby allowing buffer sizes, the shared memory size, queue sizes, and other parameters to be optimized for a particular implementation. For example, in an Ethernet implementation a buffer size of 512 bytes will typically result in the use of one to three buffers per packet.

According to one embodiment of the present invention, the shared memory manager 220 includes a buffered architecture that utilizes a shared pool of packet memory and a dynamic buffer allocation scheme. In this embodiment, the shared memory manager 220 is responsible for managing the shared pool of free buffers in the shared memory 230. It services two categories of clients, buffer consumers (e.g., the input ports 206) and buffer providers (e.g., the output ports 206). The buffer consumers request free buffers from the shared memory manager 220 at appropriate times during incoming packet reception. Then, during packet forwarding processing, buffer ownership changes hands between the two client types. Finally, at the appropriate times during packet transmission buffers are returned by the buffer providers to the shared memory manager 220.

Figure 3A:
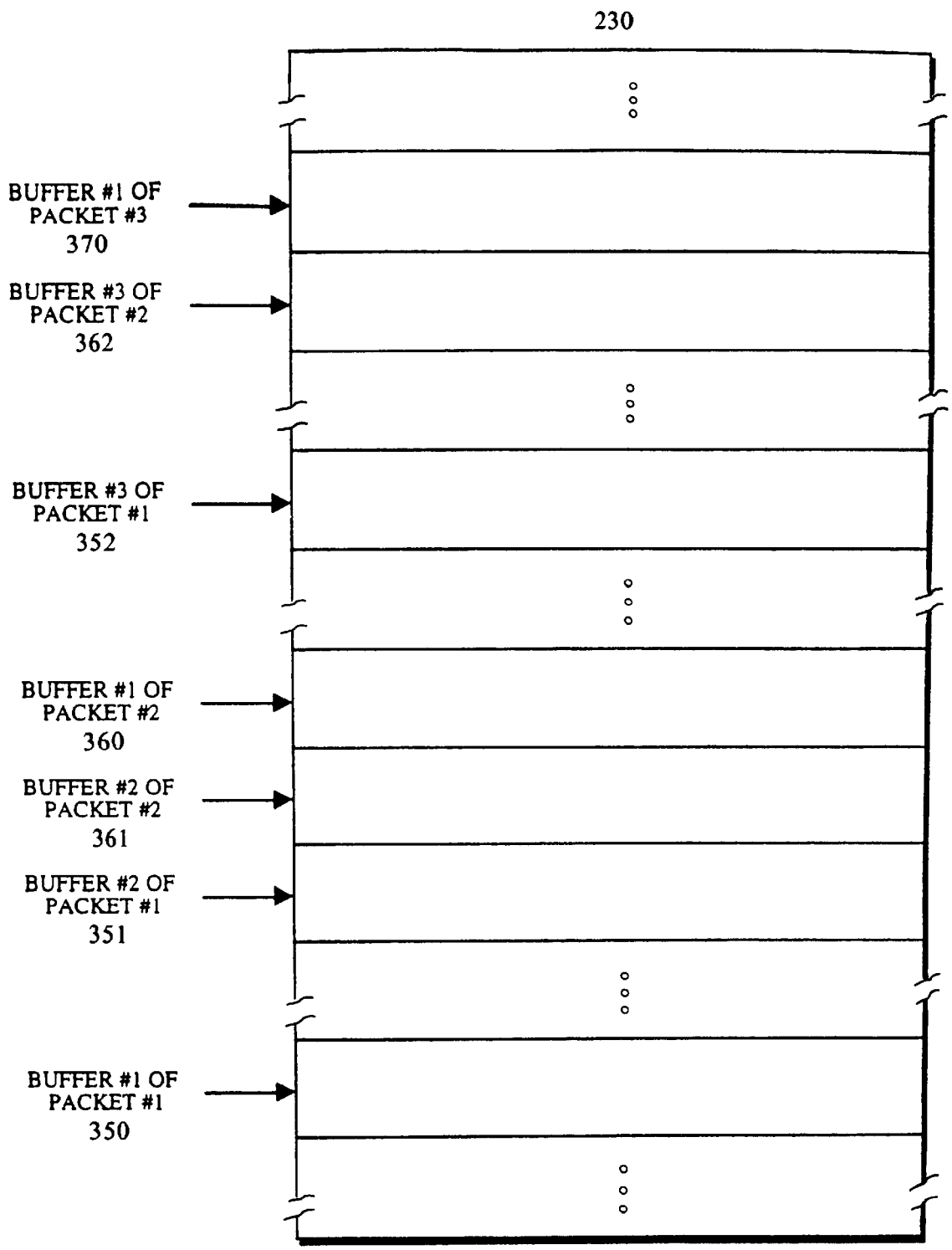
FIG. 3A is a logical view of the shared memory of FIG. 2 according to one embodiment of the present invention.

Referring now to FIG. 3A, a logical view of shared memory 230 is depicted having stored therein packet data in a number of buffers. In this example, the shared memory 230 is segmented into a number of buffers (pages) of programmable size. All the buffers may have the same size, or alternatively, individual buffer sizes may vary. In another embodiment, the buffers may be further subdivided into a number of memory lines. Each line may be used for storing packet data. In other embodiments, control information may also be associated with each of the memory lines. The control information may include information for facilitating efficient access of the packet data such as an end of packet field. The separation of control information and data increases the efficiency of accesses to and from the shared memory 230.

A given packet's data may be stored in one or more buffers. In this example, packet #1 is distributed across three buffers 350–352, packet #2's data is stored in three buffers 360–362, and packet #3 is fully contained within one buffer 370. This example also illustrates that the buffers for a particular packet and the packets themselves need not be in any particular order in the shared memory 230. In this manner, when a particular buffer becomes free, it may be immediately used to fulfill the next buffer request. Also, it may be convenient to limit packet data contained within a particular buffer to one packet. That is, the implementation may be simplified by preventing the mixing of more than one packet within a buffer. In this embodiment, it should be appreciated a packet is represented as a list of one or more buffers. Therefore, forwarding packet #1 from an input port 206 to an output port 206 would involve removing the pointers to buffers 350–352 from the input port's input queue and transferring them to an output queue of the output port 206.

Exemplary Shared Memory Manager

Figure 3B:
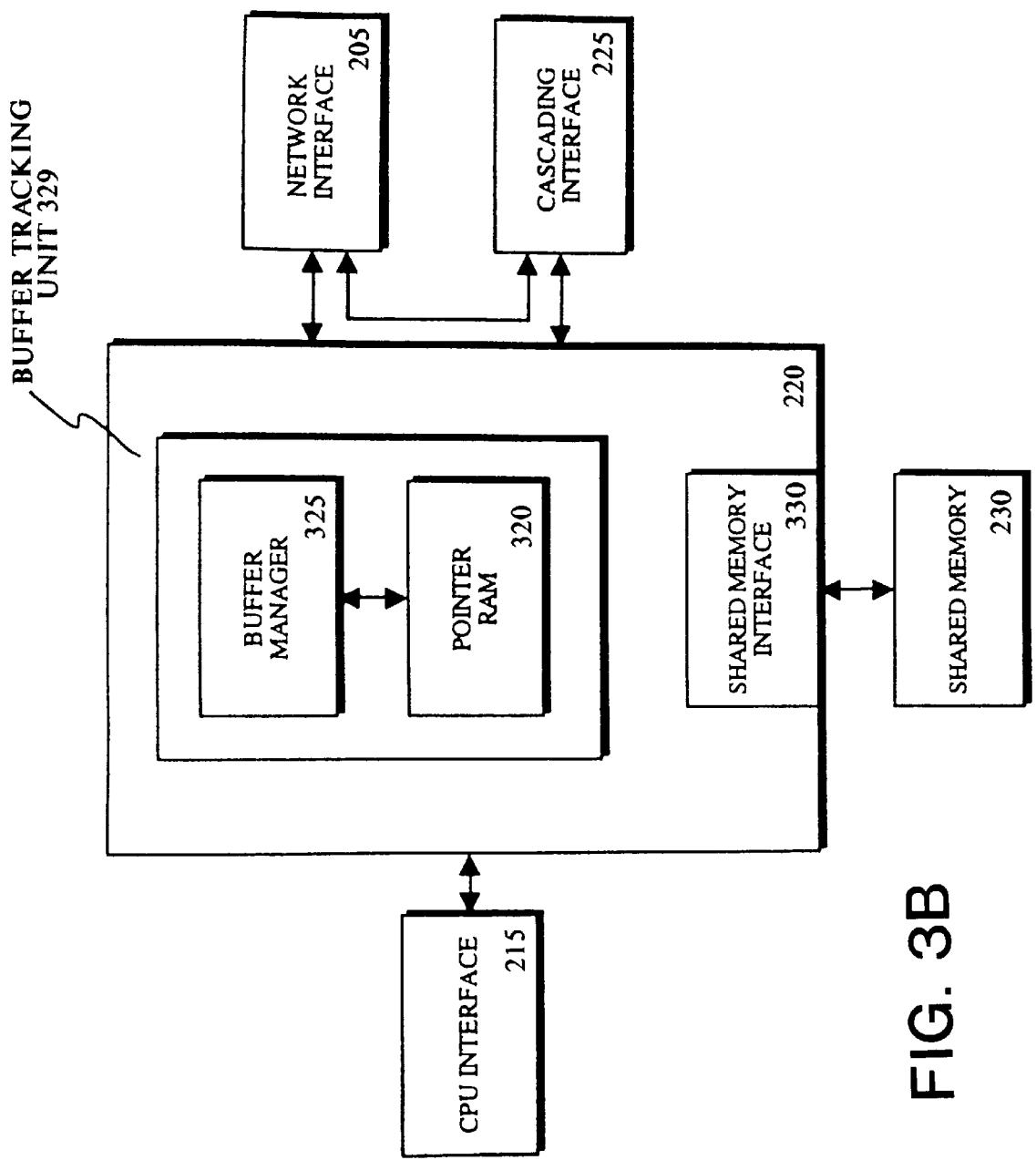
FIG. 3B is a block diagram of the shared memory manager of FIG. 2 according to one embodiment of the present invention.

FIG. 3B is a block diagram of the shared memory manager of FIG. 2 according to one embodiment of the present invention. According to this embodiment, the shared memory manager 220 includes a buffer tracking unit 329 and a shared memory interface 330. The shared memory interface 330 provides an efficient centralized interface to the shared memory 230. The buffer tracking unit 329 further includes a buffer manager 325. The buffer manager 325 provides a level of indirection which is exploited by the input and output ports 206 by queuing pointers to buffers that contain packet data rather than queuing the packet data itself. As such, the buffering provided by the present invention does not fit into the prior buffering categories such as input packet buffering or output packet buffering. Rather, the buffering architecture described herein is well suited for shared memory buffering with output queuing, for example. Advantageously, since pointers are queued at the ports, the act of forwarding, according to the present embodiment, is simplified to transferring one or more buffer pointers between an input port 206 to an output queue of one or more output ports 206.

Additionally, this flexible approach allows each buffer in the shared memory 230 to be "owned" by one or more different ports at different points in time without having to duplicate the packet data. For example, copies of a multicast packet's buffer pointer(s) may reside in several output port queues while only one copy of the packet data need reside in the shared memory 230.

The buffer tracking unit 329 additionally includes a pointer random access memory (PRAM) 320. The PRAM 320 may be an on or off-chip pointer table that stores usage counts for buffers of the shared memory 230. Since the assignee of the present invention has found it advantageous to implement each switching element 100 as a single application specific integrated circuit (ASIC), it is preferred that the pointer table be kept compact enough to allow it to be maintained on-chip to facilitate the desired highly integrated implementation.

In any event, with reference to the PRAM 320, the number of buffer owners at a given time is known by the buffer manager 325; thereby allowing the buffer manager 325 to perform efficient real-time free buffer determination for dynamic buffer allocation and allowing efficient deallocation processing of buffers upon their release by the last output port 206. Importantly, the next free buffer, if memory is available, is always kept on hand by the buffer tracking unit 329 for immediate delivery to the requesting input port 206. The processing involved in allocating buffers, transferring buffer ownership, and deallocating buffers will be described in further detail below.

Exemplary Buffer Tracking Process

Figure 4:
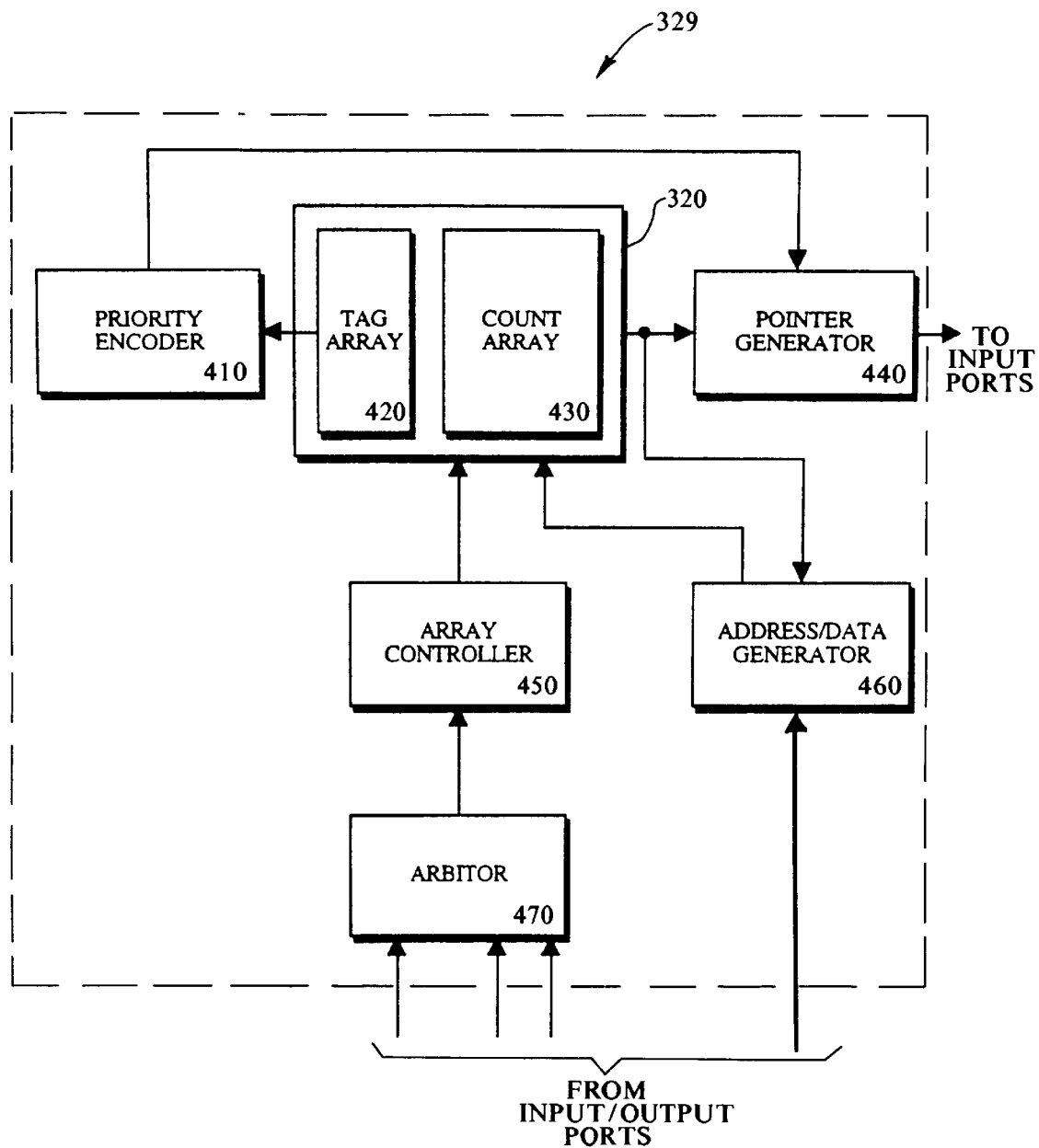
FIG. 4 is a block diagram of the buffer tracking process of FIG. 3B according to one embodiment of the present invention.

FIG. 4 is a block diagram of the buffer tracking unit 329 of FIG. 3B according to one embodiment of the present invention. In the embodiment depicted, the buffer tracking unit 329 includes an arbitor 470, an array controller 450, an address/data generator 460, PRAM 320, a priority encoder 410, and a pointer generator 440.

According to the present embodiment, the PRAM 320 further includes a count array 430 and a tag array 420. The count array 430 is a memory that stores a count representing the number of ports that are currently using a corresponding buffer in the shared memory 230. In one embodiment, the location of a given count field in the count array 430 represents the start address of the corresponding buffer in the shared memory 230. In this manner, the same pointer may be used to determine the buffer ownership count and to store and retrieve packet data.

In one embodiment, the count array 430 is divided into rows and columns. Each row may store a set of one or more of the plurality of count fields. In this example, the tag array 420 is a memory that has the same number of rows as the count array 430 and contains a field indicating the availability of a buffer in the corresponding row of the count array 430. That is, if any of the count fields in the corresponding row of the count array 430 are zero, meaning no owners, for example, then the tag field is a one, meaning a buffer is available, for example. Advantageously, this indexing mechanism facilitates the real-time indication of free buffers. Alternative configurations are contemplated. For example, in alternative embodiments, the count array 430 and the tag array 420 may share the same memory.

Arbitor 470 arbitrates among the input ports and the output ports 206 to provide only a single port with access to the PRAM 320 at any given time. The arbitor 470 is coupled to the array controller 450 to allow the single port selected to access the PRAM 320. The array controller 450 schedules read and write operations for the PRAM 320 allowing access to both the tag array 420 and the count array 430.

The address/data generator 460 generates control signals for the particular memory or memories employed by the PRAM 320 to facilitate modification of the count fields and tag fields. Handshake signals for the input and output ports 206 are also generated by the address/data generator 460 as will be described in more detail below. Additionally, the address/data generator 460 may provide a conversion from a buffer pointer to a row address in the count array 430.

The priority encoder 410 has inputs corresponding to each element of the tag array 420. In one embodiment, it generates an output which indicates the location of the first non-zero tag bit in the tag array 420. The output of the priority encoder 410 is an input to the pointer generator 440. According to one embodiment, the pointer generator 440 compares the entries from the row indicated by the priority encoder 410 and adds an encoding representative of the position of an available buffer to produce a buffer pointer for one of the input ports 206.

Buffer Allocation Processing

Figure 5:
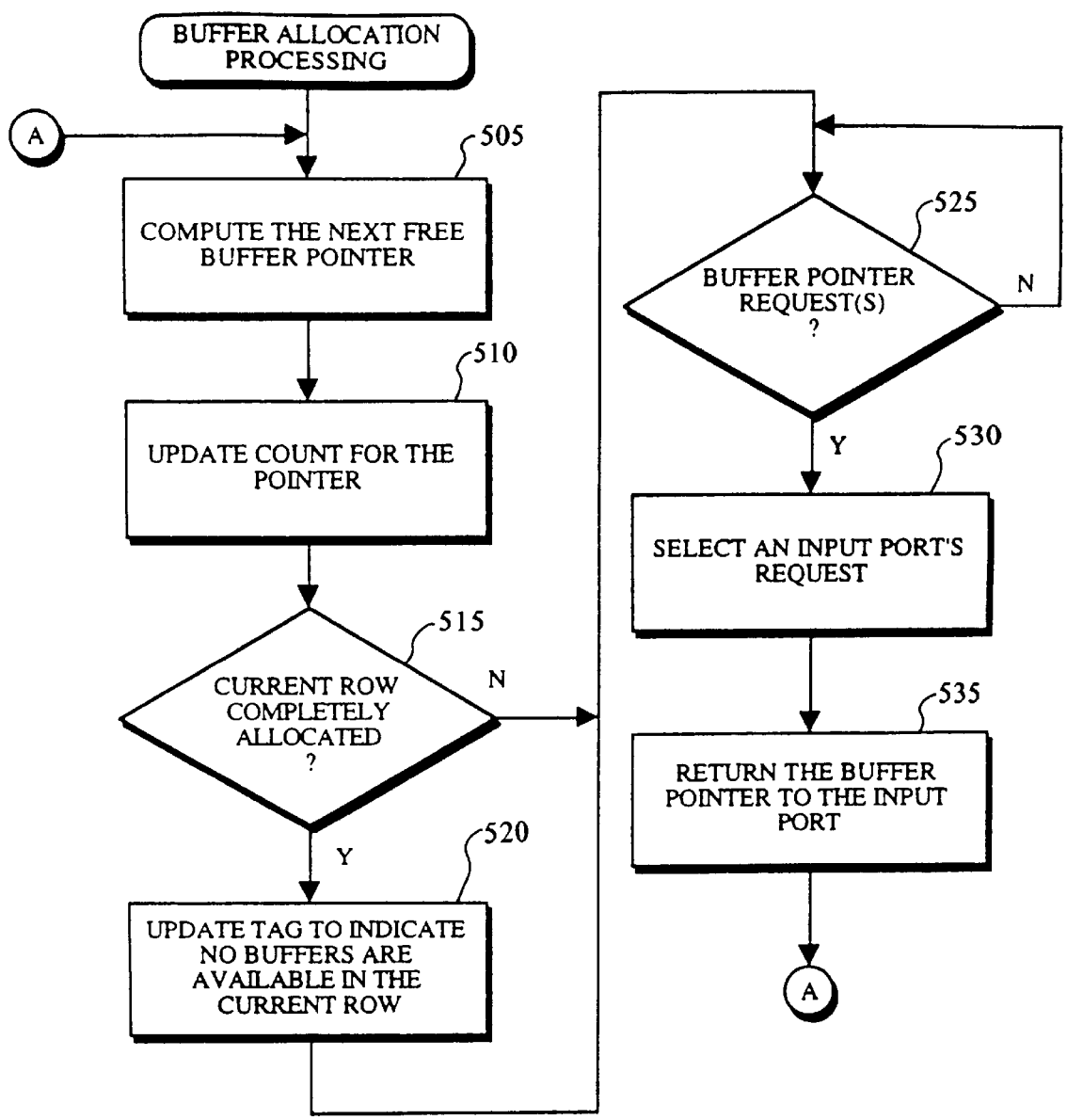
FIG. 5 is a flow diagram illustrating buffer allocation processing according to one embodiment of the present invention.

FIG. 5 is a flow diagram illustrating buffer allocation processing according to one embodiment of the present invention. At step 505, the next free buffer pointer is produced by the pointer generator 440. In one embodiment, the pointer generator 440 attempts to keep one or more pointers available to allow immediate servicing of buffer requests.

At step 510, the count field corresponding to the generated pointer is updated. In one embodiment, this is accomplished by writing a predetermined value, such as the maximum value, to the count field. For example, the maximum value for a 4-bit counter is 15 or 1111b.

At step 515, if the current row of count fields contains no free buffers after the update of step 510, then at step 520 the tag corresponding to this row is updated to so indicate. Otherwise, processing continues with step 525.

At step 525, the buffer tracking unit 329 waits until one or more input ports 206 request a buffer pointer. Upon detecting one or more requests, processing continues with step 530.

At step 530, one input port request is selected for processing by the buffer tracking unit 329. In one embodiment, the input port requests are received by the arbitor 470. The arbitor 470 selects one of the input port requests for servicing by the buffer tracking unit 329. In another embodiment, the buffer tracking unit 329 may support mixed port speeds by giving priority to the faster network links. For example, the arbitor 470 may be configured to arbitrate between the buffer pointer requests in a prioritized round robin fashion giving priority to the faster interfaces by servicing each slow interface (e.g., Fast Ethernet port) for each N faster interfaces (e.g., Gigabit Ethernet ports).

At step 535, the free buffer pointer is returned to the input port 206 that was selected at step 530. Buffer allocation processing may continue by repeating steps 505–535.

Buffer Ownership Transfer Processing

Figure 6:
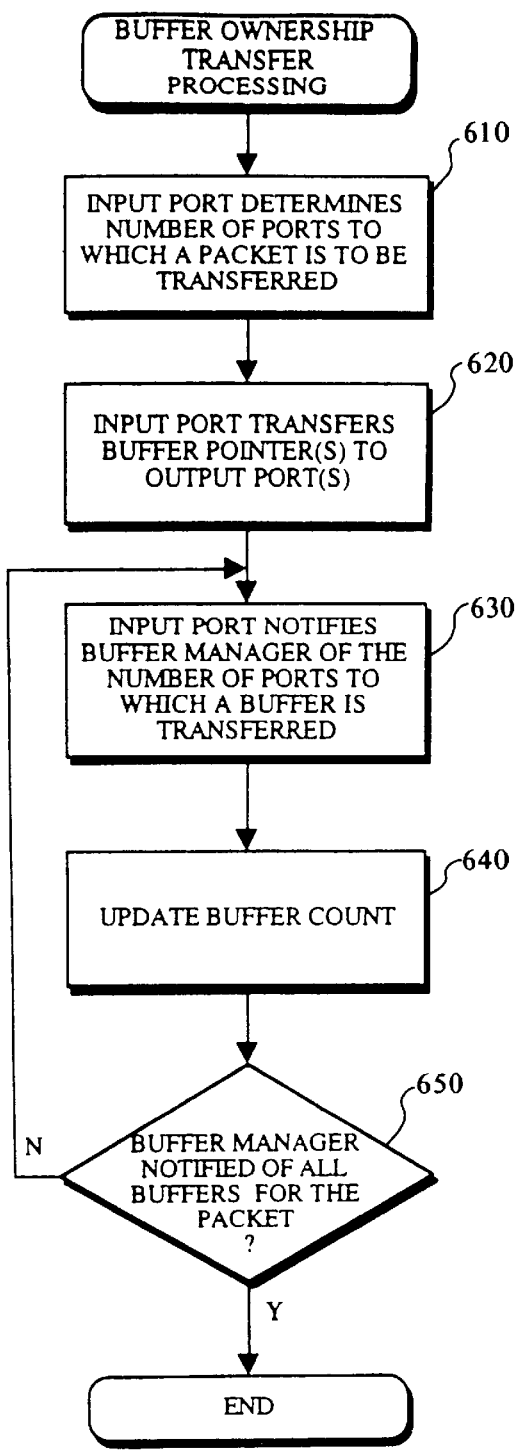
FIG. 6 is a flow diagram illustrating buffer ownership transfer processing according to one embodiment of the present invention.

FIG. 6 is a flow diagram illustrating buffer ownership transfer processing according to one embodiment of the present invention. At step 610, an input port 206 determines the number of ports to which a packet is to be forwarded based upon a forwarding decision received from the switch fabric 210.

For each buffer in which the packet's data is stored, the input port 206 performs steps 620–640. At step 620, the input port 206 transfers a buffer pointer to the output port(s) 206 indicated by the forwarding decision. At step 630, the input port 206 notifies the buffer manager 325 of the ownership transfer of the buffer from the input port 206 to the output port(s) 206 by communicating the number of output ports to which the buffer was successfully transferred to the buffer manager 325.

At step 640, the count field associated with the current buffer is updated to reflect the number of output ports that will transmit the buffer. Importantly, the inventors of the present invention have designed the update mechanism described herein to operate in such a manner that does not require the buffer accounting to be race free. Before describing the novel update mechanism, the race condition that is resolved by the update mechanism will now briefly be described.

As should be appreciated, before an input port 206 can notify the buffer manager 325 of the number of output ports to which a particular buffer pointer was transferred, the input port 206 determines if the output port(s) 206 can accept an additional buffer pointer by testing an output queue full indication, for example. It is possible for one or more output ports 206 to receive a buffer pointer, transmit the packet data associated with the buffer pointer, and update the buffer count before the input port 206 has notified the buffer manager 325 of the total number of output ports.

The update mechanism that handles the race condition described above will now be described. According to one embodiment, the buffer manager 325 may be configured to perform a read/modify/write on the count field rather than simply setting the count field to the number indicated by the input port 206. Recall, in the buffer allocation process, according to one embodiment, the count field is set to a predetermined value, such as the count field's maximum value (e.g., Fh) upon buffer allocation. Therefore, during buffer ownership transfer processing, the count field may be updated to reflect the current number of output ports that will transmit the buffer by reading the current contents of the appropriate count field, adding the number supplied by the input port 206 to the current contents plus a predetermined value to compensate for the initial value written by the buffer tracking unit 329 during buffer pointer allocation, and then writing the result back to the count field. Advantageously, in this manner, the count field will accurately reflect the current number of output ports for the buffer pointer whether or not the count field was previously decremented by one or more output ports 206 as illustrated in Table 1, below. Table 1 illustrates the count field's value after each of the actions in the first column.

TABLE 1

| Action | Count Field |
| --- | --- |
| An input port 206 requests a buffer pointer from the buffer tracking unit 329. | 0000b |
| A buffer pointer is provided to the input port 206. | 1111b |
| The forwarding decision indicates the packet including the buffer is to be forwarded to three output ports 206. | 1111b |
| The input port notifies the buffer tracking unit 329 of the number of owners of the buffer and forwards the buffer pointer to each of the three output ports 206. | 1111b |
| One output port 206 completes transmission of the buffer and notifies the buffer tracking unit 329 that it no longer holds a copy of the buffer pointer. | 1111b |
| The buffer tracking unit 329 processes the output port's notification prior to the input port's notification.<br>    Read:      1111b<br>    Modify:   1111b − 0001b = 1110b<br>    Write:     1110b | 1110b |
| The buffer tracking unit 329 processes the input port's notification which indicates there are 3 buffer owners.<br>    Read:      1110b<br>    Modify:   1110b + 0011b + 0001b = 0010b<br>    Write:     0010b | 0010b |
| The other two output ports 206 complete transmission of the buffer and so notify the buffer tracking unit 329. | 0010b |
| The buffer tracking unit updates the count field. | 0000b |

At step 650, it is determined if all buffers for the packet have been processed. If so, the ownership transfer of this packet is complete; otherwise, processing continues with step 620.

Buffer Return Processing

Figure 7:
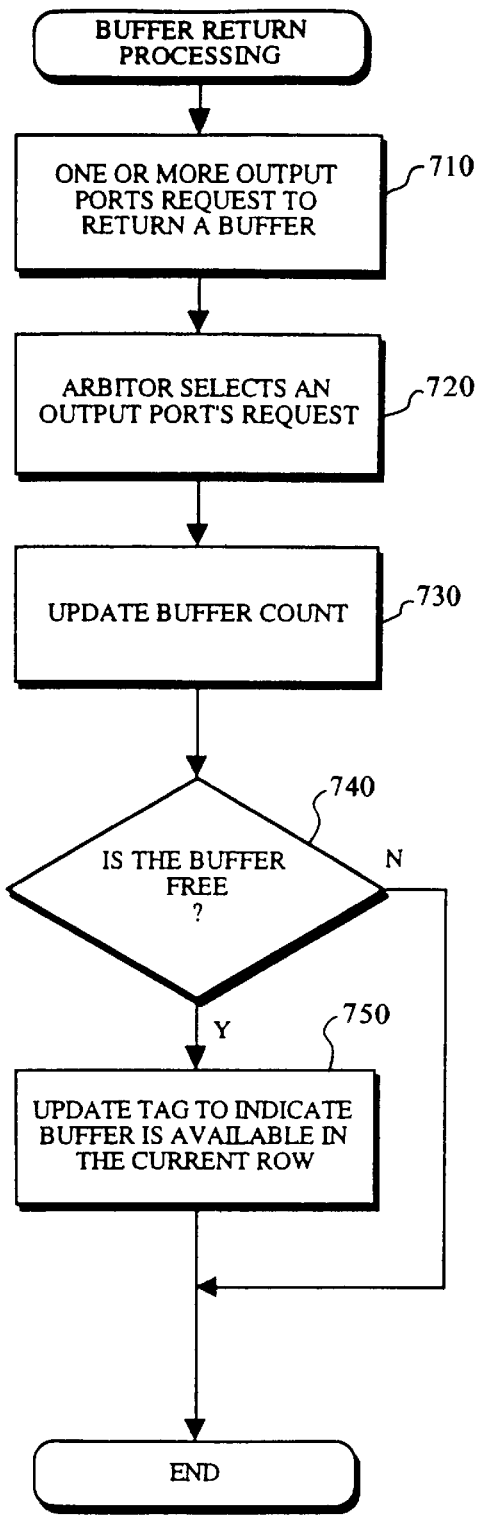
FIG. 7 is a flow diagram illustrating buffer return processing according to one embodiment of the present invention.

FIG. 7 is a flow diagram illustrating buffer return processing according to one embodiment of the present invention. After output ports 206 have finished transmitting the contents of particular buffer, the output port 206 returns the buffer pointer so that it may be reused in the buffer allocation processing discussed above.

In the present embodiment, at step 710, one or more output ports 206 request to return a buffer. At step 720, the arbitor 470, selects a request to service.

At step 730, the buffer count is updated to reflect the fact that one less output port 206 owns the buffer. For example, the buffer count may be decremented by performing a read/modify/write operation.

At step 740, if the buffer is now free, processing continues with step 750. A buffer is free when no output ports 206 have a pointer to this buffer pending in any of their output queues. In one embodiment, the buffer is determined to be free based upon the count field being decremented to zero. However, alternative embodiments may use other indications.

At step 750, a tag corresponding to the set of buffers to which the current buffer belongs is updated to indicate the availability of a buffer in this set of buffers. In one embodiment, a tag array is employed which stores a single bit for each set of buffers.

Having described an exemplary method and apparatus for shared memory management, the interfaces among the components will now be described.

Buffer Manager/Input Port Interface

According to one embodiment, the following signals may be used to implement the handshake between the buffer manager 325 and the input ports 206.

(1) Br_Ptr_IP—Bus Request for the Input Port Buffer Pointer Data Bus

This signal is asserted by the input ports 206 to the buffer manager 325. At the appropriate point during input packet reception, the input port 206 asserts this signal to indicate to the buffer manager 325 that a buffer pointer is desired. A bus request acknowledgment (see Br_Ptr_IP_Ack below) is expected to be asserted by the buffer manager 325 in response.

(2) Br_Ptr_IP_Ack—Buffer Pointer Acknowledgment

This signal is asserted by the buffer manager 325 to the input port 206 that is to receive the buffer pointer (see Br_Ptr_Data_BM_to_IP[X:0] below). This signal is to acknowledge the buffer pointer request (see Br_Ptr_IP above). The buffer manager 325 arbitrates between the various requests of the input ports and drives a Bus Request Acknowledgment and the buffer pointer in the same cycle.

(3) Br_Ptr_Data_BM_to_IP[X:0]—Buffer Manager to Input Port Buffer Pointer Data Bus This data bus is shared by all input ports 206. It indicates to the input port 206 that received the Bus Request Acknowledgment (see Br_Ptr_IP_Ack above) the buffer pointer to be used for the incoming packet.

(4) Br_Count—Bus Request for the Count Data Bus

This signal is asserted by the input ports 206 to the buffer manager 325. The input port 206 determines the number of output ports that are to receive the packet based upon the forwarding decision received from the switch fabric 210. The input port 206 asserts this signal to indicate to the buffer manager 325 that the number of ports for a buffer pointer is ready. A bus request acknowledgment (see Br_Count_Ack below) is expected to be asserted by the buffer manager 325 in response.

(5) Br_Count_Ack—Buffer Count Acknowledgment

This signal is asserted by the buffer manager 325 to the input port 206 that is to provide the number of ports (see Cnt[Y:0] below) for a particular buffer pointer (see Br_Ptr_Data_IP_to_BM[X:0] below). This signal is to acknowledge the bus request (see Br_Count above) for the count data bus. The buffer manager 325 arbitrates between the various requests of the input ports and drives a bus request acknowledgment to the input port 206 selected by the arbitration.

(6) Dropped_Ptrs—Number of Ports that Couldn't Receive the Pointers

This signal is asserted by the input ports 206 to the buffer manager 325. When the input port 206 cannot post a buffer pointer to all of the output ports 206 indicated by the forwarding decision due to some condition (e.g., full output queue), the input port 206 conveys this information to the buffer manager 325 as it conveys the number of ports. The buffer manager 325 will take this into account when storing the number of output ports that own the buffer pointer indicated.

(7) Br_Ptr_Data_IP_to BM[X:0]—Input Port to Buffer Manager Buffer Pointer Data Bus This data bus is shared by all input ports 206. It indicates to the buffer manager 325 the buffer pointer for which the number of ports (see Cnt[Y:0] below) is being conveyed.

(8) Cnt[Y:0]—Count of Ports

This data bus is shared by all input ports 206. It indicates to the buffer manager 325 the number of ports to which the buffer pointer (see Br_Ptr_Data_IP_to_BM[X:0] above) has been transferred.

Buffer Manager/output Port Interface

According to one embodiment, the following signals may be used to implement the handshake between the buffer manager 325 and the output ports 206.

(1) Br_Ptr_OP—Bus Request for the Output Port Buffer Pointer Data Bus

This signal is asserted by the output ports 206 to the buffer manager 325. At the appropriate point during output packet processing, the output port 206 asserts this signal to indicate to the buffer manager 325 that a buffer pointer is being returned. A bus request acknowledgment (see Br_Ptr_OP_Ack below) is expected to be asserted by the buffer manager 325 in response.

(2) Br_Ptr_Data_OP_to_BM[X:0]—Output Port to Buffer Manager Buffer Pointer Data Bus This data bus is shared by all output ports 206. It indicates to the buffer manager 325 the buffer pointer that is being returned. Output ports 206 return buffer pointers after the data stored in the corresponding buffer has been transmitted.

(3) Br_Ptr_OP_Ack—Buffer Request Acknowledgment

This signal is asserted by the buffer manager 325 to the output port 206 that is to return their buffer pointer (see Br_Ptr_Data_OP_to_BM[X:0] above). This signal is to acknowledge the bus request (see Br_Ptr_OP above). The buffer manager 325 arbitrates between the various requests of the output ports 206 and drives a Bus Request Acknowledgment to the output port 206 selected by the arbitration logic.

Input Port/Output Port Interface

According to one embodiment, the following signals may be used to transfer packet ownership from the input ports 206 to the output ports 206.

(1) Arb_OP_Ptr—Arbitrated Output Port Buffer Pointer Data Bus

This multiplexed data bus is driven by the output bus arbiter. It is shared by all the output ports 206 for the transfer of buffer pointer ownership information.

(2) OP_Que_Full—Output Port Queue Full

This signal is asserted by the output ports 206 to the input ports 206. This signal is used by the input ports 206 to make filtering decisions when broadcasting packet pointers. That is, if the forwarding decision indicates a packet is to be forwarded to a given output port 206 and that output port's queue is full, then the packet pointer will not be transferred to that output port 206 and the buffer manager 325 may be notified of the dropped packet pointer (see Dropped_Ptrs above). Alternatively, the buffer manager 325 may simply be notified of the total number of output ports that have been provided with a particular packet pointer.

For the sake of example, only one output queue has been assumed, note however, in alternative embodiments more than one output queue may be employed for each output port 206. In this case, a queue full indication may be provided for each additional output queue.

Thus, a buffered architecture has been described which provides temporary storage of received packets in a shared pool of packet memory and provides for efficient allocation of per port buffering that is proportional to the amount of traffic through a given port.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A shared memory manager for use in a packet forwarding device, the shared memory manager comprising:

a pointer memory configured to store information regarding buffer usage in a shared memory, the pointer memory including a tag array indicating whether or not a plurality of sets of buffers contains one or more free buffers and a count array indicating for each of the buffers within the plurality of sets of buffers a number of ports of the packet forwarding device using the corresponding buffer;

an encoder coupled to the pointer memory, the encoder referencing the tag array to generate an output which indicates a selected set of buffers of the plurality of sets of buffers that contains one or more free buffers; and a pointer generator coupled to the encoder, the pointer generator referencing the count array to locate a free buffer in the selected set of buffers and producing a pointer to the located free buffer.

2. The shared memory manager of claim 1, wherein the usage counts are updated by setting the usage counts to a predetermined value to accommodate a potential race condition in usage count processing.

3. The shared memory manager of claim 2, wherein at least one of the usage counts is updated by determining a current value of the one of the usage counts; modifying the current value in a manner that accounts for buffers that may have been deallocated before the shared memory manager is notified of the number of output ports corresponding to a received packet; and replacing the current count value with the modified value, the modified value reflecting the number of output ports that currently hold a copy of a buffer pointer corresponding to the received packet; whereby the adverse effects of race conditions are avoided by accounting for buffers that may have been deallocated.

4. The shared memory manager of claim 1, wherein a given entry's location in the count array represents the address of the corresponding buffer in the shared memory.

5. A method of packet forwarding comprising the steps of:

dynamically allocating one or more buffers in a shared memory by determining one or more free buffer pointers, each of the one or more free buffer pointers corresponding to one of the one or more buffers, wherein the allocation is unconstrained by the locations of the one or more buffers within the shared memory;

receiving a packet from a first attached network segment;

storing the packet in the one or more buffers;

transferring ownership of the one or more buffer pointers from an input port to one or more output ports based upon a forwarding decision;

retrieving the packet from the one or more buffers;

transmitting the packet onto a second attached network segment;

wherein the step of dynamically allocating one or more buffers in a shared memory by determining one or more free buffer pointers further includes the step of updating a usage count corresponding to each of the one or more free buffer pointers; and wherein the step of updating a usage count corresponding to the free buffer pointer comprises the step of setting the usage count to a predetermined value to accommodate a potential race condition in usage count processing.

6. The method of claim 5, wherein the step of transmitting the packet onto a second attached network segment further includes the steps of: for each buffer of the one or more buffers, transmitting packet data from the buffer onto the second attached network segment, and deallocating the corresponding buffer pointer by returning the buffer pointer to a centralized buffer manager, whereby the buffer becomes available for storing packet data from another received packet.

7. The method of claim 5, wherein no more than one copy of the packet is stored in the shared memory.

8. A machine-readable medium having stored thereon data representing sequences of instructions, said sequences of instructions which, when executed by a processor, cause said processor to perform the steps of:

dynamically allocating one or more buffers in a shared memory by determining one or more free buffer pointers, each of the one or more free buffer pointers corresponding to one of the one or more buffers, wherein the allocation is unconstrained by the locations of the one or more buffers within the shared memory;

receiving a packet from a first attached network segment;

storing the packet in the one or more buffers;

transferring ownership of the one or more buffer pointers from an input port to one or more output ports based upon a forwarding decision;

retrieving the packet from the one or more buffers; and transmitting the packet onto a second attached network segment;

wherein the step of dynamically allocating one or more buffers in a shared memory by determining one or more free buffer pointers the step of updating a usage count corresponding to each of the one or more free buffer pointers; and wherein the step of updating a usage count corresponding to the free buffer pointer comprises the step of setting the usage count to a predetermined value to accommodate a potential race condition in usage count processing.

9. The machine-readable medium of claim 8, wherein the step of transmitting the packet onto a second attached network segment further includes the steps of: for each buffer of the one or more buffers, transmitting packet data from the buffer onto the second attached network segment, and deallocating the corresponding buffer pointer by returning the buffer pointer to a centralized buffer manager, whereby the buffer becomes available for storing packet data from another received packet.

10. A method of packet forwarding comprising the steps of:

dynamically allocating one or more buffers in a shared memory by determining one or more free buffer pointers, each of the one or more free buffer pointers corresponding to one of the one or more buffers, wherein the allocation is unconstrained by the locations of the one or more buffers within the shared memory;

receiving a packet from a first attached network segment;

storing the packet in the one or more buffers;

transferring ownership of the one or more buffer pointers from an input port to one or more output ports based upon a forwarding decision;

retrieving the packet from the one or more buffers;

transmitting the packet onto a second attached network segment;

wherein the step of transferring ownership of the one or more buffer pointers from an input port to one or more output ports based upon a forwarding decision further includes the steps of: for each buffer of the one or more buffers, performing a dequeue operation to remove the corresponding buffer pointer from an input queue, performing an enqueue operation to insert the buffer pointer into an output queue for one or more output ports indicated by the forwarding decision, notifying the shared memory manager of the number of output ports to which the buffer pointer has been successfully enqueued, and updating a usage count corresponding to the buffer pointer; and wherein the step of updating a usage count corresponding to the buffer pointer comprises the steps of: determining a current value of the usage count; modifying the current value in a manner that accounts for buffers that may have been deallocated before the step of notifying the shared memory manager of the number of output ports; and replacing the usage count with the modified value, the modified value reflecting the number of output ports that currently hold a copy of the buffer pointer; whereby the adverse effects of race conditions are avoided by accounting for buffers that may have been deallocated in the modifying step.

11. The method of claim 10, wherein the forwarding decision identifies a set of one or more output ports, and wherein the method further includes the step of determining a subset of the set of one or more output ports to which to transfer the one or more buffer pointers.

12. The method of claim 11, further including the step of the one or more output ports generating queue status indications; and wherein the step of determining a subset of the set of one or more output ports to which to transfer the one or more buffer pointers is based upon the queue status indications generated by the one or more output ports.

13. A machine-readable medium having stored thereon data representing sequences of instructions, said sequences of instructions which, when executed by a processor, cause said processor to perform the steps of:

dynamically allocating one or more buffers in a shared memory by determining one or more free buffer pointers, each of the one or more free buffer pointers corresponding to one of the one or more buffers, wherein the allocation is unconstrained by the locations of the one or more buffers within the shared memory;

receiving a packet from a first attached network segment;

storing the packet in the one or more buffers;

transferring ownership of the one or more buffer pointers from an input port to one or more output ports based upon a forwarding decision, the step of transferring ownership of the one or more buffer pointers from an input port to one or more output ports based upon a forwarding decision further includes the steps of: for each buffer of the one or more buffers, performing a dequeue operation to remove the corresponding buffer pointer from an input queue; performing an enqueue operation to insert the buffer pointer into an output queue for one or more output ports indicated by the forwarding decision, notifying the shared memory manager of the number of output ports to which the buffer pointer has been successfully enqueued, and updating a usage count corresponding to the buffer pointer; wherein the step of updating a usage count corresponding to the buffer pointer comprises the steps of: determining a current value of the usage count; modifying the current value in a manner that accounts for buffers that may have been deallocated before the step of notifying the shared memory manager of the number of output ports; and replacing the usage count with the modified value, the modified value reflecting the number of output ports that currently hold a copy of the buffer pointer; whereby the adverse effects of race conditions are avoided by accounting for buffers that may have been deallocated in the modifying step;

retrieving the packet from the one or more buffers; and transmitting the packet onto a second attached network segment.

* * * * *